(12) United States Patent
Talmola et al.

(10) Patent No.: US 7,821,997 B2
(45) Date of Patent: Oct. 26, 2010

(54) COMPUTER IMPLEMENTED METHOD, SYSTEM, AND INTERGRATED CIRCUITRY FOR DETERMINING A CHARACTERISTIC OF A RECEIVED SIGNAL TO HAVE FALLEN BENETH A THRESHOLD

(75) Inventors: Pekka Talmola, Turku (FI); Tommi Auranen, Turku (FI)

(73) Assignee: Nokia Corporation, Espoo (FI)

( * ) Notice: Subject to any disclaimer, the term of this patent is extended or adjusted under 35 U.S.C. 154(b) by 587 days.

(21) Appl. No.: 11/080,160

(22) Filed: Mar. 15, 2005

(65) Prior Publication Data

US 2006/0209762 A1 Sep. 21, 2006

(51) Int. Cl.
*H04B 7/212* (2006.01)
(52) U.S. Cl. ..................................... 370/332
(58) Field of Classification Search ................. 370/332
See application file for complete search history.

(56) References Cited

U.S. PATENT DOCUMENTS

| | | | |
|---|---|---|---|
| 4,549,311 A | 10/1985 | McLaughlin | |
| 4,868,885 A | 9/1989 | Perry | |
| 5,678,185 A | 10/1997 | Chia | |
| 6,101,383 A | 8/2000 | Poon | |
| 6,389,285 B1 | 5/2002 | Escamilla et al. | |
| 6,658,256 B2 | 12/2003 | Wille | |
| 6,842,609 B2 | 1/2005 | Davis et al. | |
| 2002/0183061 A1 | 12/2002 | Moore | |
| 2002/0188723 A1 | 12/2002 | Choi et al. | |

FOREIGN PATENT DOCUMENTS

| EP | 0 625 863 | 11/1994 |
|---|---|---|
| EP | 0944274 | 9/1999 |
| WO | WO 2004/019647 A1 | 3/2004 |
| WO | WO 2004/025975 | 3/2004 |

OTHER PUBLICATIONS

International Search Report of International Application No. PCT/IB2006/000563—Date of Completion of Search: Jul. 17, 2006.

*Primary Examiner*—William D Cumming
(74) *Attorney, Agent, or Firm*—Locke Lord Bissell & Liddell LLP (57) ABSTRACT

Systems and methods applicable, for instance, in wireless communications. For example, a wireless node and/or other computer may act to create a candidate signal list and/or may act to measure strength for one or more candidate list signals. As another example, the wireless node and/or other computer may act to calculate average difference between the strength of the strongest signal of the candidate list and the strength of a currently-received signal. As yet another example, the wireless node and/or other computer may act to perform one or more operations to employ the strongest signal of the candidate list in place of the currently-received signal.

44 Claims, 7 Drawing Sheets

COMPUTER IMPLEMENTED METHOD, SYSTEM, AND INTERGRATED CIRCUITRY FOR DETERMINING A CHARACTERISTIC OF A RECEIVED SIGNAL TO HAVE FALLEN BENETH A THRESHOLD

FIELD OF INVENTION

This invention relates to systems and methods for wireless communications.

BACKGROUND INFORMATION

In recent times, there has been an increase in the use of wireless communications. For example, many users have come to prefer wireless services such as, for instance, Digital Video Broadcasting Handhelds (DVB-H) services to other sources of news, entertainment, information, and the like.

Accordingly, there may be interest in technologies that, for example, facilitate wireless communications.

SUMMARY OF THE INVENTION

According to embodiments of the present invention there are provided systems and methods applicable, for instance, in wireless communications.

For example, in various embodiments a wireless node and/or other computer may act to create a candidate signal list and/or may act to measure strength for one or more candidate list signals. As another example, in various embodiments the wireless node and/or other computer may act to calculate average difference between the strength of the strongest signal of the candidate list and the strength of a currently-received signal. Moreover, in various embodiments, the wireless node and/or other computer may act to perform one or more operations to employ the strongest signal of the candidate list in place of the currently-received signal.

DETAILED DESCRIPTION OF THE INVENTION

General Operation

According to embodiments of the present invention there are provided systems and methods applicable, for instance, in wireless communications.

For example, in various embodiments a wireless node and/or other computer that has determined one or more criteria to be met (e.g., a reception margin for a currently-received signal to have fallen beneath a certain threshold) may act to select one or more signals from a candidate signal list, the signal list perhaps having been created beforehand. In doing so the wireless node and/or other computer might, for instance, calculate one or more strength averages.

The wireless node and/or other computer might, in various embodiments, subsequently act to measure strength for one or more signals of the candidate list. Measurement frequencies of such strengths might, perhaps, be dynamic. One or more strength averages might, in various embodiments, be calculated.

In various embodiments, in the case where the wireless node and/or other computer found one or more criteria to be met, the wireless node and/or other computer might act to perform one or more operations with respect to the strongest signal of the candidate signal list. The wireless node and/or other computer might, for example, act to calculate average difference between the strength of the strongest signal of the candidate list and the strength of the currently-received signal. Where, in various embodiments, the wireless node and/or other computer found one or more criteria to be met (e.g., average strength difference to be above a certain threshold), the wireless node and/or other computer might perform one or more operations to employ the strongest signal of the candidate list in place of the currently-received signal.

Various aspects of the present invention will now be discussed in greater detail.

Figure 1:
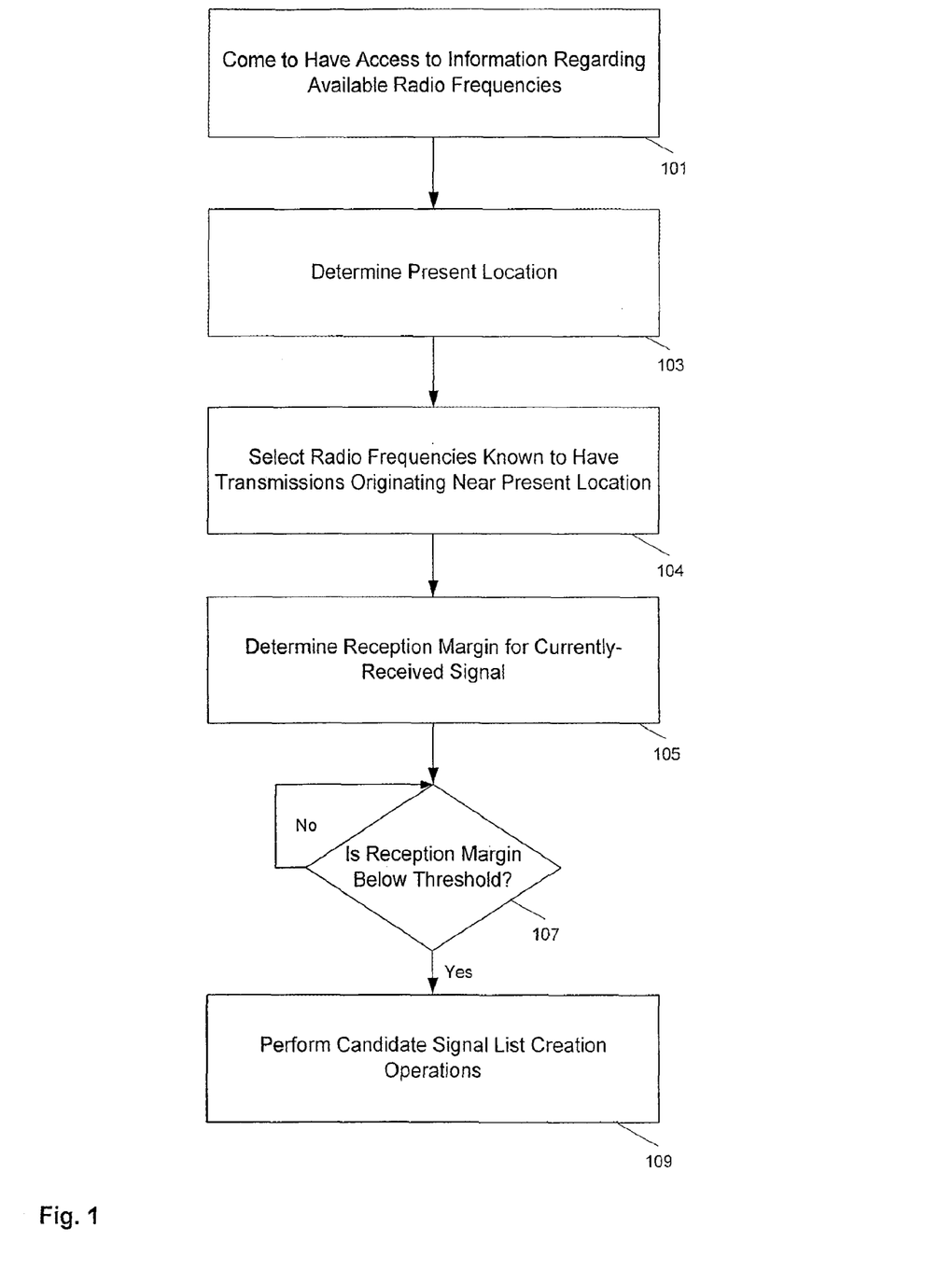
FIG. 1 shows exemplary steps involved in available radio frequency operations and currently-received signal monitoring operations according to various embodiments of the present invention.

Available Radio Frequency Operations and Currently-Received Signal Monitoring Operations With respect to FIG. 1 it is noted that, according to various embodiments of the present invention, a wireless node and/or other computer may come to have access to information regarding available radio frequencies employable in determining a signal to employ in place of a currently-received signal (step 101). Such functionality may be implemented in a number of ways.

For example, the wireless node and/or other computer might come to learn of such information regarding available radio frequencies by scanning for signals. Such scanning might, in various embodiments, involve achieving synchronization lock (e.g., time slicing synchronization lock) with a found signal and/or determining if a found signal was an appropriate type of signal (e.g., a Digital Video Broadcasting: Handhelds (DVB-H) signal). Determining if a found signal was an appropriate type of signal might, for instance, involve the wireless node and/or other computer examining one or more bits received via the signal. For example, received Transmission Parameter Signaling (TPS) bits might be examined in determining if a found signal was a DVB-H signal.

It is noted that, in various embodiments, a wireless node and/or other computer learning of information regarding available radio frequencies by scanning for signals might act to determine if one or more desired services (e.g., one or more services specified by a user of the wireless node and/or other computer, and/or one or more services presently being received by the wireless node and/or other computer) were available via a found signal. Such services might, in various embodiments, be DVB-H services. Such functionality might, for instance, involve consideration of received service listings data (e.g., channel listings data, electronic program guide (EPG) data, electronic service guide (ESG) data, and/or interactive service guide (ISG) data) and/or consideration of data (e.g., service data) received via the signal. In various embodiments, in the case where the wireless node and/or other computer determined that a found signal did not provide any desired services, it might not further consider the signal.

As another example of the wireless node and/or other computer coming to have access to information regarding available radio frequencies employable in determining a signal to employ in place of a currently-received signal, the wireless node and/or other computer might come to learn of such information regarding available radio frequencies via received Service Information (SI) and/or Program Specific Information (PSI) tables (e.g., Network Information Tables (NITs)), the wireless node and/or other computer perhaps making use of descriptors therein. In various embodiments the wireless node and/or other computer might, perhaps in a manner analogous to that discussed above, act to determine if one or more desired services (e.g., of the sort discussed above) were available via a signal provided by a radio frequency for which information was received. In various embodiments, in the case where the wireless node and/or other computer determined that a signal did not provide any desired services, it might not further consider the signal.

As yet another example, the wireless node and/or other computer might come to have access to such information via cell broadcast (e.g., Short Message Service (SMS) cell broadcast (SMS-CB)), via one or more received messages (e.g., email, SMS, and/or Multimedia Messaging Service (MMS) messages), via received service listings data (e.g., of the sort discussed above), via received web pages, and/or via received Global Positioning System (GPS) based tables. Such received messages might, for example, be responsive to requesting messages (e.g., email, SMS, and/or MMS messages) dispatched by the wireless node and/or other computer. It is noted that, in various embodiments, such cell broadcast, messages, service listings data, web pages, and/or GPS-based tables might be made available by a service provider and/or system administrator.

In various embodiments the wireless node and/or other computer might, perhaps in a manner analogous to that discussed above, act to determine if one or more desired services (e.g., of the sort discussed above) were available via a signal provided by a radio frequency for which information was received. In various embodiments, in the case where the wireless node and/or other computer determined that a signal did not provide any desired services, it might not further consider the signal.

The wireless node and/or other computer may, in various embodiments, act to select from accessible information regarding available radio frequencies one or more radio frequencies for further consideration. Radio frequencies so selected might, for example, be radio frequencies known to have corresponding transmissions originate near the present location of the wireless node and/or other computer (step 104). The wireless node and/or other computer might, for instance, learn of its location by employing GPS hardware and/or communications hardware (e.g., DVB-H hardware) (step 103). In so making use of communications hardware the mobile node and/or other computer might, for example, act to query access points (e.g., base stations) for location information, to employ Enhanced Observed Time Difference (E-OTD), and/or the like. The wireless node and/or other computer might, for instance, know of locations of transmission origination via accessible information regarding available radio frequencies of the sort discussed above.

It is noted that, in various embodiments, no such radio frequency selection might occur. For example, in various embodiments the information regarding available radio frequencies to which the wireless node and/or other computer has access might correspond only to radio frequencies meeting one or more criteria (e.g., that corresponding transmissions originate nearby). Such criteria might, for instance, be set by a service provider and/or system administrator.

The wireless node and/or other computer, perhaps after performing one or more operations relating to available radio frequencies, may act to determine if one or more criteria have been met. Such criteria might, for example, be specified by a manufacturer, and/or might include one or more criteria corresponding to the quality of a currently-received signal. Accordingly, for example, a criterion might be that reception margin for the currently-received signal fall below a specified threshold (step 107). For example, a reception margin of 20 dB might be specified.

In the case where the wireless node and/or other computer found the one or more criteria to not have been met (e.g., the wireless node and/or other computer found the reception margin to not be below a specified threshold), the wireless node and/or other computer might, in various embodiments, continue to periodically check if the one or more criteria were met. In the case where the wireless node and/or other computer found the one or more criteria to have been met (e.g., the wireless node and/or other computer found the reception margin to be below the specified threshold), the wireless node and/or other computer might, in various embodiments, act to perform one or more candidate signal list creation operations (step 109). Such operations are discussed in greater detail below.

The functionality by which the wireless node and/or other computer could act to determine reception margin for the currently-received signal could be implemented in a number of ways (step 105). For example, the wireless node and/or other computer might act to measure the strength of the currently-received signal during each received burst, the wireless node and/or other computer perhaps computing a corresponding sliding average. Such computation of a sliding average might, for instance, involve computation over a specified number of samples (e.g., 10), the number perhaps being specified by a service provider and/or system administrator.

In various embodiments of the present invention, where the currently-received signal is, for instance, a DVB-H signal, reception margin might, for example, be calculated as the difference between Received Signal Strength Indicator (RSSI) for the currently-received signal and an RSSI minimum value. The RSSI minimum value might be dependent, for example, on the modulation type and/or code rate of the transmission, receiver characteristics (e.g., receiver noise figure), and/or the noise floor depending on the used bandwidth. RSSI minimum values might, for instance, be stored in the wireless node and/or other computer (e.g., in a table). Modulation type and/or code rate might, for example, be extracted from the TPS bits and/or be used for accessing stored RSSI minimum values.

RSSI minimum values (e.g., as stored in the wireless node and/or other computer) might, in various embodiments, be based on Table A.1 (Required C/N for non-hierarchical transmission to achieve a BER=$2\times10^{-4}$ after the Viterbi decoder for all combinations of coding rates and modulation types) of Annex A of European Telecommunications Standards Institute (ETSI) document EN 300 744 (Digital Video Broadcasting (DVB); Framing structure, channel coding and modulation for digital terrestrial television). EN 300 744 is incorporated herein by reference. The RSSI minimum values (e.g., as stored in the wireless node and/or other computer) might, in various embodiments, be modified from Table A.1 of EN 300 744 in order, for example, to take into consideration the characteristics of the receiver. Alternately or additionally, in various embodiments the RSSI minimum values (e.g., as stored in the wireless node and/or other computer) might be based at least in part on measurements.

It is noted that, in various embodiments, the wireless node and/or other computer may come to have access to information regarding optimum available radio frequencies. It is further noted that, in various embodiments, various operations discussed herein may, for example, be performed with respect to DVB (e.g., DVB-H) signals, and/or signals made available via time slicing. Moreover, it is noted that, in various embodiments, time and/or power savings may be yielded by various operations discussed herein.

In various embodiments, strength of a signal might be considered to be the field strength of that signal. Alternately or additionally, in various embodiments strength of a signal might be considered to be based on one or more or more field strength related indications. Such field strength related indications might, for example, include RSSI.

Candidate Signal List Creation Operations

As noted above, in various embodiments the wireless node and/or other computer may come to have access to information regarding available radio frequencies. With respect to FIG. 2 it is noted that, in acting to create a candidate signal list a wireless node and/or other computer may, for example, act to attempt synchronization lock (e.g., TPS synchronization lock or time slicing synchronization lock) for signals corresponding to one or more of such radio frequencies (e.g., radio frequencies selected for further consideration) (step 201).

Figure 2:
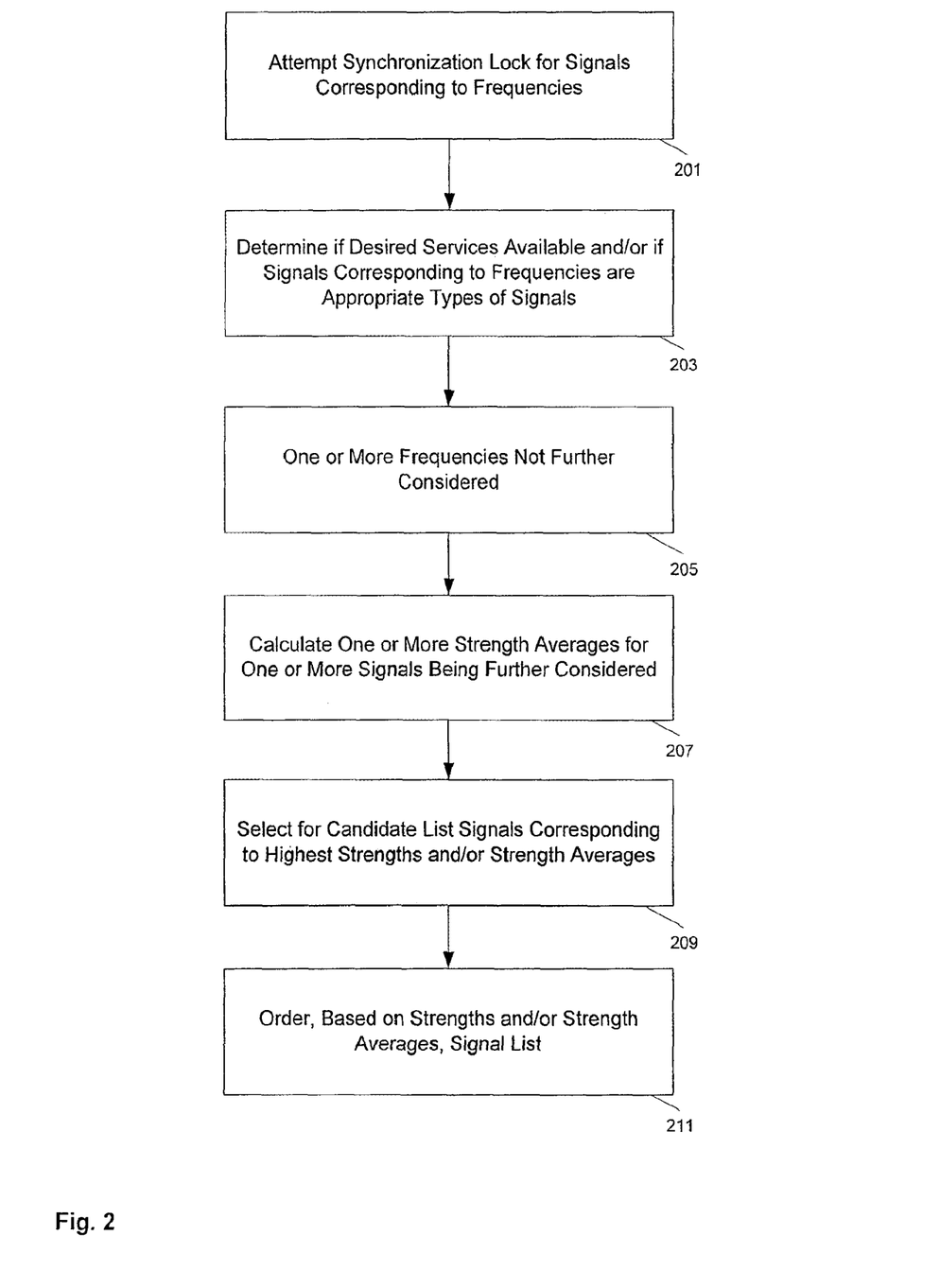
FIG. 2. shows exemplary steps involved in candidate signal list creation operations according to various embodiments of the present invention.

As another example, with respect to accessible information regarding available radio frequencies the wireless node and/or other computer might act to determine if one or more desired services (e.g., of the sort discussed above) were available via a signal provided by a radio frequency for which information was received (step 203). Such functionality might, perhaps, be implemented in a manner analogous to that discussed above. As yet another example, the wireless node and/or other computer might act to determine if signals corresponding to radio frequencies were appropriate types of signals (e.g., DVB-H signals) (step 203). Determination of a signal to be of an appropriate type might, for example, be performed in a manner analogous to that discussed above.

Where the wireless node and/or other computer was not able to achieve synchronization lock with respect to a radio frequency for which it had access to information, where the wireless node and/or other computer found such a radio frequency to not provide any desired services, and/or where the wireless node and/or other computer determined a corresponding signal to not be of an appropriate type, the wireless node and/or other computer might not further consider the radio frequency (step 205).

As a further step in acting to create a candidate signal list the wireless node and/or other computer could, for instance, act to characterize one or more of the signals corresponding to one or more of the radio frequencies. Accordingly, for example, the wireless node and/or other computer might act to characterize radio frequencies being further considered.

Such characterization might take a number of forms. For instance, the wireless node and/or other computer might act to characterize strength for one or more of the signals. Accordingly, for example, the wireless node and/or other computer might act to calculate one or more strength averages (e.g., sliding averages) for one or more of the signals (step 207). Such average calculation might, in various embodiments, involve measurements taken for specified lengths of time (e.g., lengths statistically long enough). Such lengths might, for instance, be specified by a service provider and/or system administrator.

In various embodiments, characterization of radio frequencies being further considered might, for instance, involve performing measurements in a non-time slicing synchronized mode, the wireless node and/or other computer measuring strength with or without demodulator lock. Implementation of measurement functionality is discussed in greater detail below.

As yet another step in acting to create a candidate signal list the wireless node and/or other computer might, for example, act to select a certain number of signals corresponding to one or more of the radio frequencies to make up the candidate signal list. The selected signals might, for instance, be ones corresponding to radio frequencies most positively characterized. Accordingly, for example, the selected signals might be ones corresponding to strongest strengths and/or highest strength averages (step 209). The number of signals to be selected might, for instance, be specified by a user and/or manufacturer. As an example, the number of signals to be selected might be three.

It is noted that, in various embodiments, the selected signals might be ones corresponding to desired services (e.g., of the sort discussed above). It is further noted that, in various embodiments, the candidate signal list might indicate an order for listed signals. For instance, the candidate signal list might list signals in order of strengths and/or strength averages (step 211). In various embodiments, implementation of such functionality might be such that ascending and/or descending order is employed. To illustrate by way of example, a candidate signal list that listed a specified number of signals in descending order, with the signal having the strongest corresponding strength and/or highest strength average being listed first, might be employed.

Moreover, it is noted that, in various embodiments, various operations discussed herein may, for example, be performed with respect to DVB (e.g., DVB-H) signals, and/or signals made available via time slicing. It is additionally noted that, in various embodiments, time and/or power savings may be yielded by various operations discussed herein.

Candidate Signal List Employment Operations

According to various embodiments of the present invention, the wireless node and/or other computer may perform one or more operations in employment of a candidate signal list.

Figure 3:
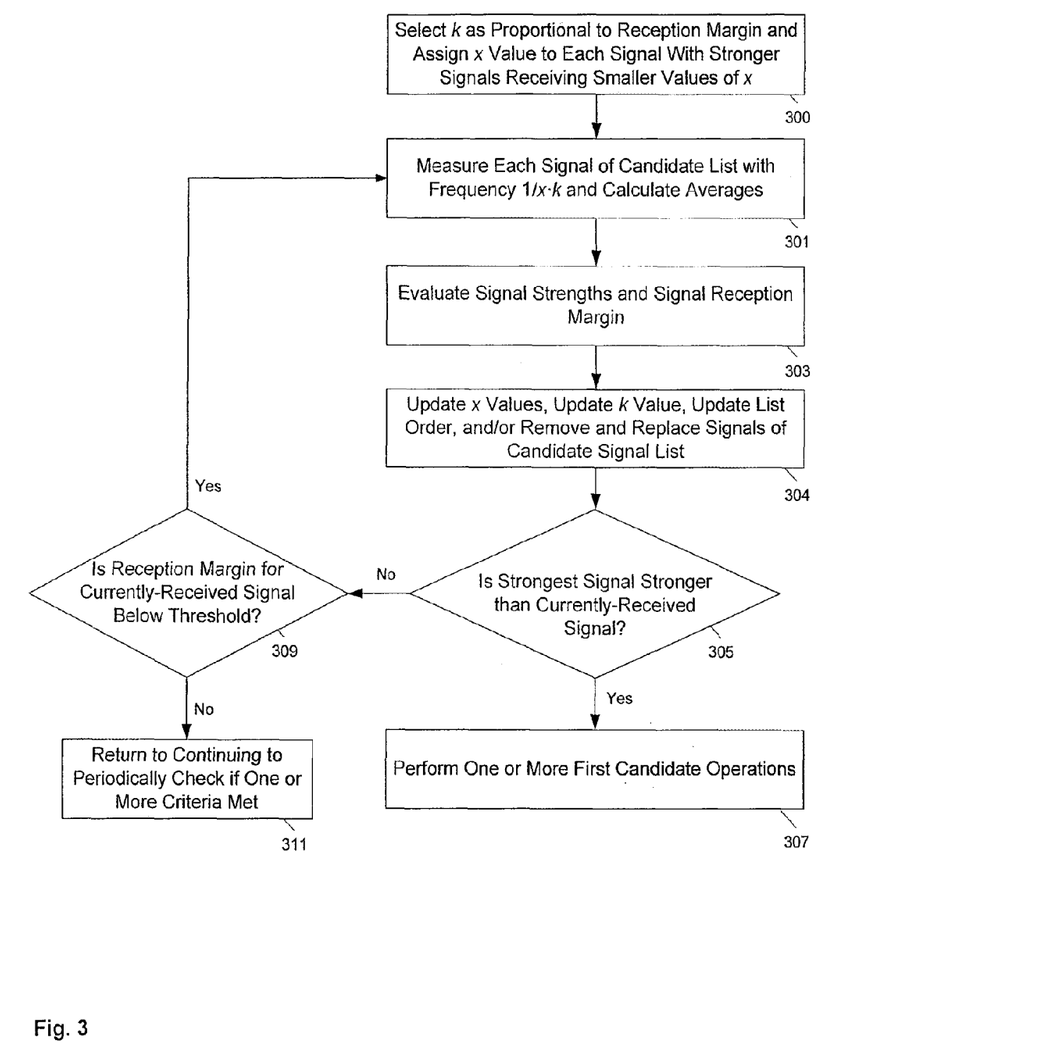
FIG. 3 shows exemplary steps involved in candidate signal list employment operations according to various embodiments of the present invention.

With respect to FIG. 3 it is noted that, for example, the wireless node and/or other computer may act to characterize one or more of the signals of the candidate signal list. Accordingly, for instance, the wireless node and/or other computer may act to measure strength for one or more signals of the candidate signal list. In various embodiments, the wireless node and/or other computer may act to employ such measured strengths in calculating one or more strength averages (e.g., sliding averages) (step 301). Such averages might, in various embodiments, be calculated over a specified number of measurements, such specification perhaps being provided by a service provider and/or system administrator. The functionality whereby the wireless node and/or other computer could act to so measure strengths could be implemented in a number of ways. For instance, frequency of such measurements might be dynamic.

For example, the wireless node and/or other computer might act to measure each signal of the candidate signal list with a frequency $$\frac{1}{x \cdot k}$$

measurements per received burst of a currently-received signal (step 301), with k, in various embodiments, being proportional to the reception margin for the currently-received signal, and x, in various embodiments, being different for each of the signals (step 300). For instance, different values of x might be employed for each of the signals with stronger signals receiving smaller values of x. Such stronger signals might, for instance, be ones having stronger strengths and/or higher strength averages. Possible x values might, in various embodiments, be specified by a service provider and/or system administrator. It is noted that, in various embodiments, k might have a minimum value of 1.

Accordingly, for example, in various embodiments stronger signals of the candidate signal list could be measured more frequently (by virtue of smaller values of x), and/or all signals of the candidate signal list could be measured more frequently in the case where reception of the currently-received signal worsened as evidenced by the corresponding reception margin dropping (by virtue of smaller values of k).

It is noted that, in various embodiments, the wireless node and/or other computer could act to, perhaps periodically, evaluate the strengths (e.g., strengths and/or strength averages) of the signals (step 303). Such evaluation might, for instance, be employed in updating the values of x employed for the signals (e.g., such that assignment of smaller values of x to stronger signals kept up with changing strength values) (step 304). Likewise, in various embodiments the wireless node and/or other computer could act to, perhaps periodically, evaluate currently-received signal reception margin (step 303). Evaluation might, for instance, be employed in updating employed k value (e.g., such that k kept up with changing reception margin) (step 304). Accordingly, for instance, measurement frequencies could in various embodiments dynamically change.

It is noted that, in various embodiments, order of signals in the candidate signal list could be in order of strengths of those signals, and with so updating strengths the wireless node and/or other computer might additionally act to appropriately update the list order (step 304). It is further noted that, in various embodiments, signals of the candidate signal list may be removed from the list and replaced with other signals (e.g., other signals corresponding to available frequencies) (step 304). Such might take place, for instance, in the case where strength fell beneath a certain threshold and/or where synchronization lock was lost. It is noted that, in various embodiments, such criteria might impose more stringent or less stringent requirements than those that had to be met for a signal to have been added to the list in the first place. It is further noted that such criteria might, in various embodiments, be set by a manufacturer.

As an illustrative example, in various embodiments, n might be employed as the x value for a strongest one of the signals, m might be employed as the x value for a second strongest of the signals, and l might be employed as the x value for a third strongest of the signals, where n<m<l. As a further illustrative example, in various embodiments, in the case where $$\frac{1}{x \cdot k} = \frac{1}{2}$$

for a particular signal, that signal would be measured once every two received bursts of a currently-received signal, in the case where $$\frac{1}{x \cdot k} = \frac{1}{4}$$

for a particular signal, that signal would be measured once every four received bursts of a currently-received signal, in the case where $$\frac{1}{x \cdot k} = 1$$

for a particular signal, that signal would be measured once every received burst of a currently-received signal.

According to various embodiments, the wireless node and/or other computer might act to determine if one or more criteria were met. Such criteria might, for example, include the strongest signal (e.g., according to strengths and/or strength averages) of the candidate list being, perhaps to a specified extent (e.g., 3 dB), stronger than the currently-received signal (step 305). Such might, for example, be specified by a manufacturer.

In the case where such criteria were found to be met, the wireless node and/or other computer might, for instance, act to perform one or more first candidate operations (step 307). Such operations are discussed in greater detail below.

In the case where such criteria were found not to be met, the wireless node and/or other computer might, in various embodiments, act to determine if one or more further criteria were met. Such further criteria might, for example, include reception margin for the currently-received signal being below a specified threshold (step 309). Such criteria (e.g., such a threshold) might, perhaps, be set by a manufacturer. Such a reception margin threshold, and the reception margin threshold discussed previously with regard to available radio frequency operations and currently-received signal monitoring operations, might, in various embodiments, be set to the same value. To illustrate by way of example, a value of 20 dB might be specified might be set for each.

In the case where the one or more further criteria were found to be met (e.g., where the reception margin for the currently-received signal was found to be below a specified threshold), the wireless node and/or other computer might, for instance, act to continue characterization of one or more of the signals of the candidate signal list (e.g., continue strength measurement and/or strength average calculation as discussed above). In the case where the one or more further criteria were found to not be met (e.g., where the reception margin for the currently-received signal was found to not be below a specified threshold), the wireless node and/or other computer might, for instance act to return to the functionality of continuing to periodically check if one or more criteria were met discussed above with regard to available radio frequency operations and currently-received signal monitoring operations (step 311).

It is noted that, in various embodiments, the functionality discussed herein where sliding averages are calculated may provide benefits including, for instance, appropriately dealing with Rayleigh fading. It is further noted that, in various embodiments, various operations discussed herein may, for example, be performed with respect to DVB (e.g., DVB-H) signals, and/or signals made available via time slicing. Moreover, it is noted that, in various embodiments, time and/or power savings may be yielded by various operations discussed herein.

First Candidate Operations and Signal Employment Operations

The wireless node and/or other computer may, in various embodiments, perform one or more first candidate operations. With respect to FIG. 4 it is noted that, for example, the wireless node and/or other computer may act to characterize the strongest signal of the candidate signal list (step 401). Such characterization might, for example, involve measurement of strength. As another example, packet error ratio (PER) (e.g., transport stream packet error ratio) might alternately or additionally be measured. Measurement of strength might, for instance, be performed in a manner analogous to that discussed above. Frequency of characterization might, for example, be once per received burst of a currently-received signal.

Figure 4:
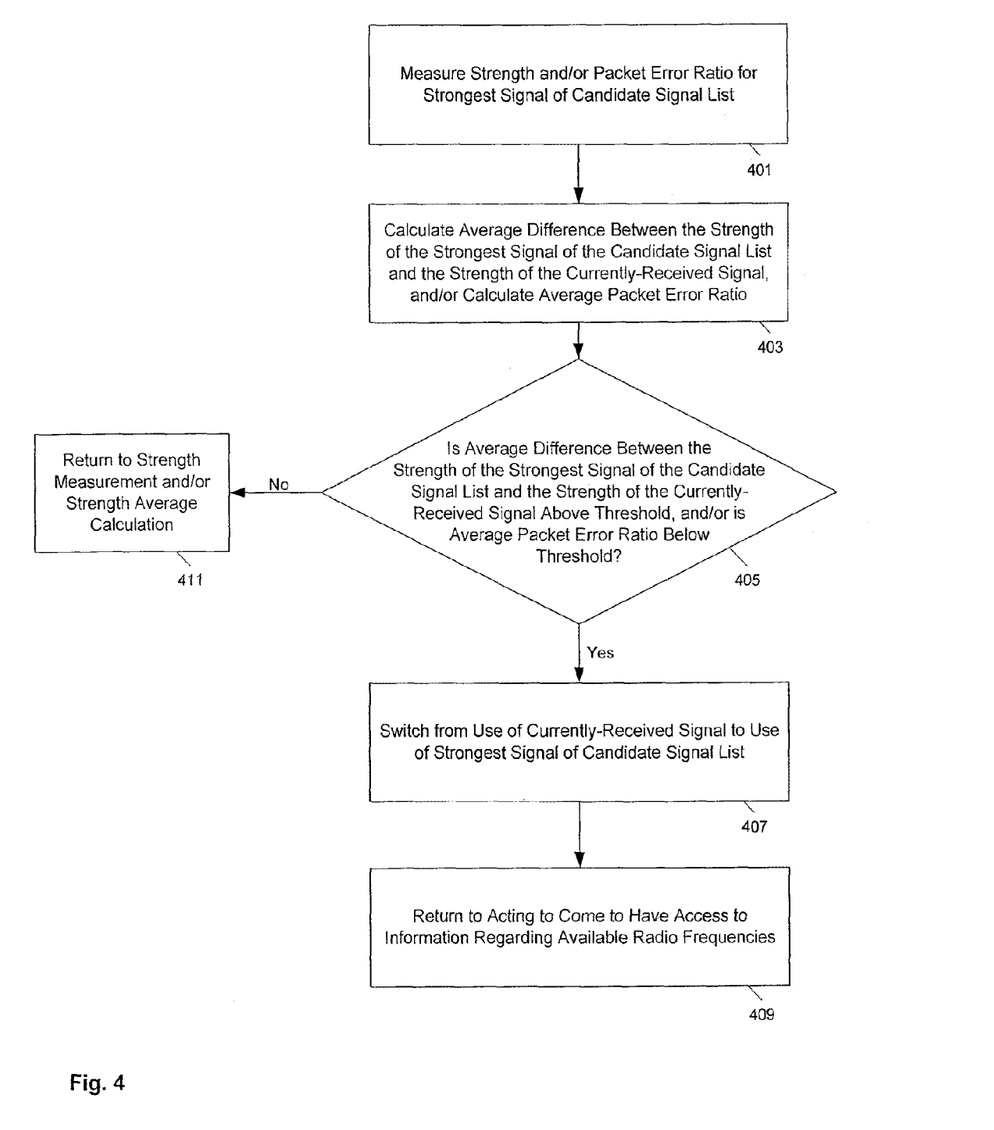
FIG. 4 shows exemplary steps involved in first candidate operations and signal employment operations according to various embodiments of the present invention.

The wireless node and/or other computer might, as another example, act to calculate one or more averages (e.g., sliding averages) (step 403). Such averages might, for example, include average difference between the strength of the strongest signal of the candidate signal list and the strength of the currently-received signal. As another example, such averages might include average PER. In various embodiments, such averages might be calculated over a specified number of measurements (e.g., in accordance specification provided by a service provider and/or system administrator).

The wireless node and/or other computer might, as yet another example, act to determine if one or more criteria were met (step 405). Such criteria might, perhaps, be set by a service provider and/or system administrator. Such criteria might, for instance, include the average difference between the strength of the strongest signal of the candidate signal list and the strength of the currently-received signal being above a specified threshold. Such a specified threshold, and the threshold concerning strongest signal of the candidate list and currently received signal discussed previously with regard to candidate signal list employment operations, might, in various embodiments, be set to the same value (e.g., 3 dB).

Alternately or additionally, such criteria might, for instance, include the average PER being below a specified threshold. Such a threshold might, for example, be set to a value at or above which PER would be considered so high as to result in unacceptable communication quality.

In the case where the criteria were found to be met, the wireless node and/or other computer might, for instance, act to perform one or more signal employment operations.

For example, the wireless node and/or other computer might act to switch from use of the currently received signal to use of the strongest signal of the candidate signal list (step 407). In various embodiments, the wireless node and/or other computer might act to perform one or more synchronization operations (e.g., one or more time slicing synchronization operations).

As another example, the wireless node and/or other computer may return to acting to come to have access to information regarding available radio frequencies as discussed above with respect to available radio frequency operations and currently-received signal monitoring operations (step 409). The wireless node and/or other computer might, in various embodiments, do so in view of information newly available by virtue of switching to use of the strongest signal of the candidate signal list. Accordingly, for instance, information accessible by the wireless node and/or other computer regarding available radio frequencies might be updated based on the newly-available information.

In the case where the criteria were found not to be met, the wireless node and/or other computer might, for instance, act to return to characterizing one or more signals of the candidate signal list (e.g., continuing strength measurement and/or strength average calculation) as discussed above with regard to candidate signal list employment operations (step 411).

It is noted that, in various embodiments, various operations discussed herein may, for example, be performed with respect to DVB (e.g., DVB-H) signals, and/or signals made available via time slicing. It is further noted that, in various embodiments, time and/or power savings may be yielded by various operations discussed herein.

Measurement Functionality

As discussed above, in various embodiments measurements (e.g., strength measurements) of signals other than a currently-received signal may be performed. Such functionality may be implemented in a number of ways.

For example, the wireless node and/or other computer may act to perform such measurement after (e.g., as soon as possible after) receiving a burst of the currently-received signal. The wireless node and/or other computer might, for instance, keep active until measurement is complete reception circuitry that was activated for receiving the burst.

As another example, the wireless node and/or other computer may act to perform such measurement before (e.g., as soon as possible prior to) receiving a burst of the currently-received signal. The wireless node and/or other computer might, for instance, activate reception circuitry a certain amount of time before arrival of a subsequent burst of the currently-received signal. Such a certain amount of time might, for instance, be such that measurement is complete before arrival of the subsequent burst. Such a certain amount of time might, in various embodiments, be calculated, and/or be set by a manufacturer.

Such calculation might, for instance, involve analysis (e.g., historical and/or statistical analysis) of past amounts of times required to complete measurements and/or of times of burst receipt. It is noted that, in various embodiments, the wireless node and/or other computer might act to leave reception circuitry active after measurement is complete such that the circuitry can be employed in reception of the subsequent burst without need for circuitry reactivation.

As yet another example, the wireless node and/or other computer may act to perform such measurement during time slicing off periods such that measurement is not performed in close proximity to receiving a burst of the currently-received signal (e.g., such that measurement is not performed as soon as possible after or as soon as possible prior to receiving the burst). Accordingly, for instance, reception circuitry might be activated specifically for purposes of performing measurement.

It is noted that, in various embodiments, various operations discussed herein may, for example, be performed with respect to DVB (e.g., DVB-H) signals, and/or signals made available via time slicing. It is further noted that, in various embodiments, time and/or power savings may be yielded by various operations discussed herein.

Fallback Operations

According to various embodiments of the present invention, the wireless node and/or other computer may act to perform one or more fallback operations. With respect to FIG. 5 it is noted that the wireless node and/or other computer might perform such operations, for instance, in response to determining lack of synchronization lock (e.g., TPS synchronization lock), perhaps for a particular period of time, with respect to a frequency corresponding to a currently-received signal (step 501). Such a particular period of time might, for instance, be specified by a manufacturer. To illustrate by way of example, such a particular period of time might be specified as a number of minutes.

Figure 5:
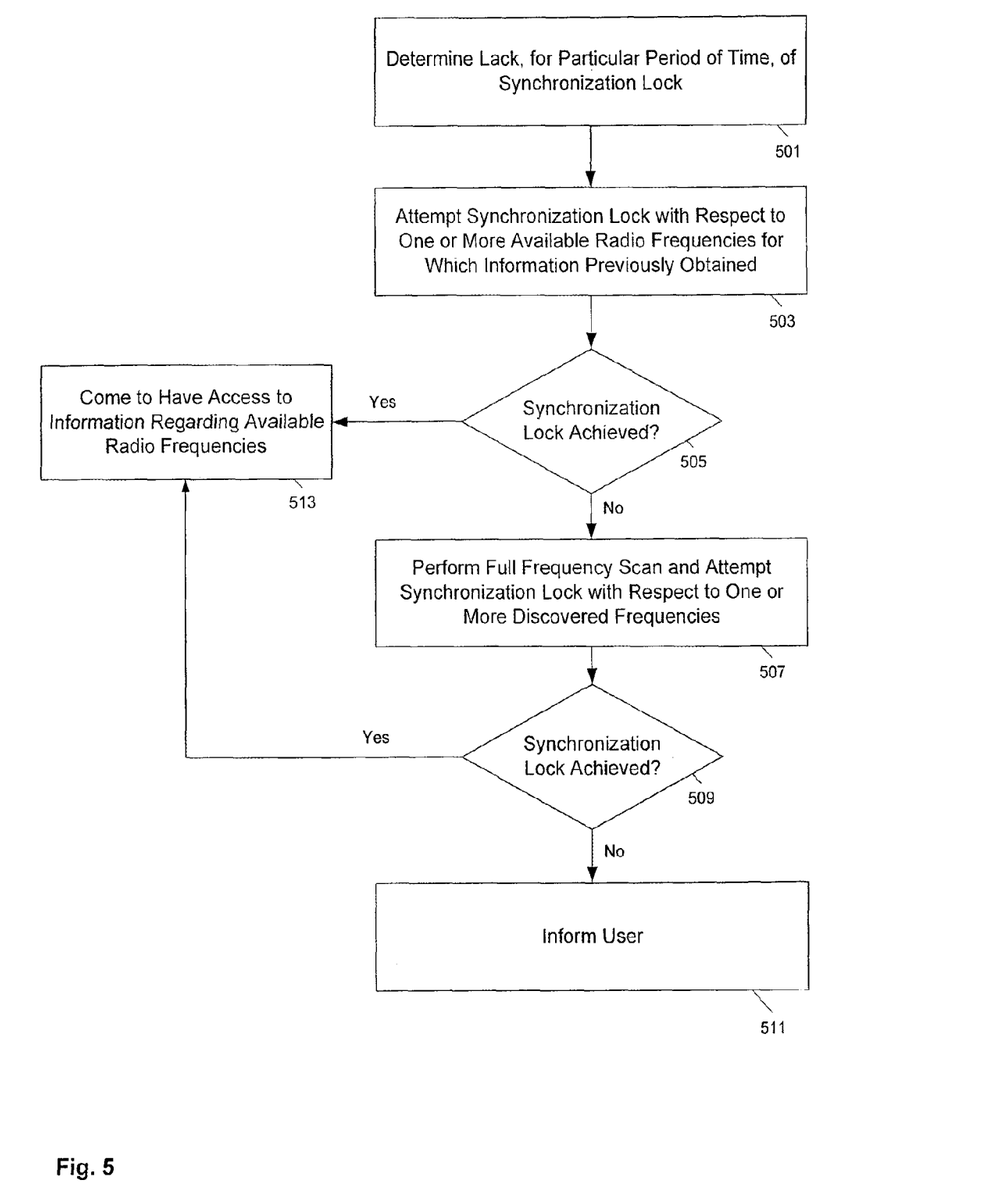
FIG. 5 shows exemplary steps involved in fallback operations according to various embodiments of the present invention.

In performing such fallback operations the wireless node and/or other computer might, for example, act to attempt synchronization lock with respect to one or more of available radio frequencies regarding which the wireless node and/or other computer had previously obtained information (e.g., as discussed above) (step 503).

In the case where synchronization lock was achieved with respect to one or more of the available radio frequencies (step 505), with one or more additional criteria perhaps being met (e.g., one or more criteria corresponding to signal quality being acceptable), the wireless node and/or other computer might, for instance, jump to acting to come to have access to information regarding available radio frequencies as discussed above with respect to available radio frequency operations and currently-received signal monitoring operations (step 513).

In the case where synchronization lock was not achieved (step 505), the wireless node and/or other computer might, for instance, act to perform a frequency scan (e.g., to perform a full frequency scan), and to attempt synchronization lock with respect to one or more radio frequencies discovered via the scanning (step 507).

In the case where synchronization lock was achieved (step 509) with respect to one or more of the radio frequencies discovered via the scanning, with one or more additional criteria perhaps being met (e.g., one or more criteria corresponding to signal quality being acceptable), the wireless node and/or other computer might, for instance, jump to acting to come to have access to information regarding available radio frequencies as discussed above with respect to available radio frequency operations and currently-received signal monitoring operations (step 513).

In the case where synchronization lock was not achieved (step 509), the wireless node and/or other computer might, for instance, act to appropriately inform its user (e.g., via a graphical user interface (GUI) and/or other interface) (step 511), to wait for action by its user (e.g., for the user to provide, perhaps via a GUI and/or other interface, directive on how to proceed), and/or to shut down one or more software modules (e.g., one or more software modules employable in use of DVB-H services.

It is noted that, in various embodiments, various operations discussed herein may, for example, be performed with respect to DVB (e.g., DVB-H) signals, and/or signals made available via time slicing. It is further noted that, in various embodiments, time and/or power savings may be yielded by various operations discussed herein.

Hardware and Software

Various operations and/or the like described herein may, in various embodiments, be implemented in hardware (e.g., via one or more integrated circuits). For instance, in various embodiments various operations and/or the like described herein may be performed by specialized hardware, and/or otherwise not by one or more general purpose processors. One or more chips and/or chipsets might, in various embodiments, be employed. In various embodiments, one or more Application-Specific Integrated Circuits (ASICs) may be employed.

Alternately or additionally, various operations and/or the like described herein may, in various embodiments, be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, communication device, node, and/or the like, a server, a network access point, a network multicast point, a network device, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or .Net.

Figure 6:
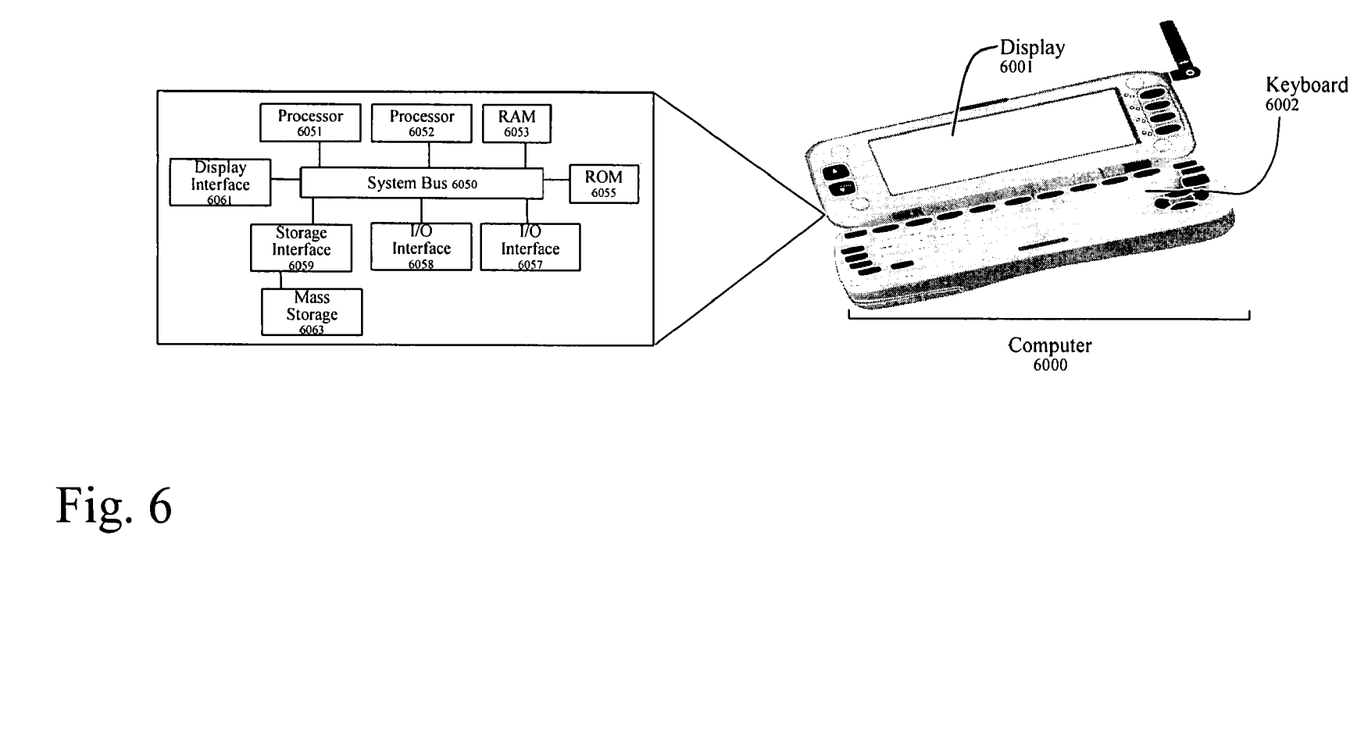
FIG. 6 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 6 is an exemplary computer employable in various embodiments of the present invention. Exemplary computer 6000 includes system bus 6050 which operatively connects two processors 6051 and 6052, random access memory 6053, read-only memory 6055, input output (I/O) interfaces 6057 and 6058, storage interface 6059, and display interface 6061. Storage interface 6059 in turn connects to mass storage 6063. Each of I/O interfaces 6057 and 6058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Audio Broadcast (DAB), Digital Radio Mondiale (DRM), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 6063 may be a hard drive, optical drive, a memory chip, or the like. Processors 6051 and 6052 may each be a commonly known processor such as an IBM or Freescale PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, or an IBM, Toshiba, or Sony Cell processor. Computer 6000 as shown in this example also includes a touch screen 6001 and a keyboard 6002. In various embodiments, a mouse, keypad, and/ or interface might alternately or additionally be employed. Computer 6000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 7:
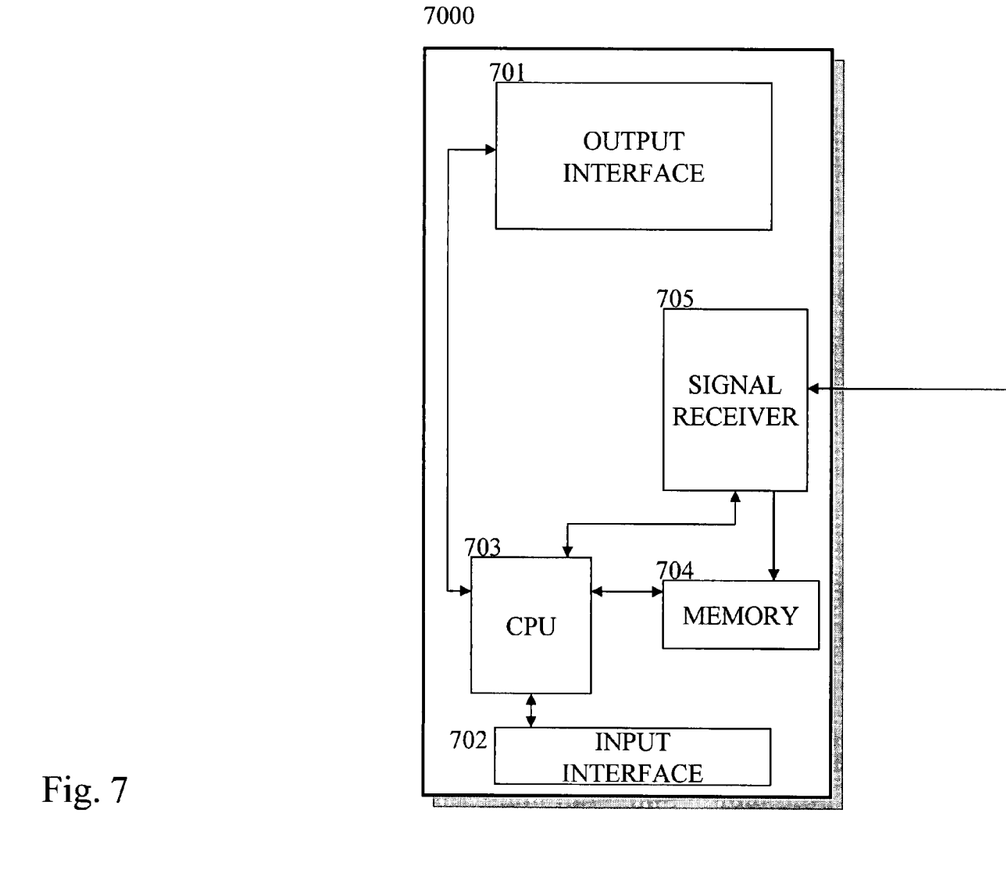
FIG. 7 shows a further exemplary computer.

Shown in FIG. 7 is a block diagram of a terminal, an exemplary computer employable in various embodiments of the present invention. In the following, corresponding reference signs are applied to corresponding parts. Exemplary terminal 7000 of FIG. 7 comprises a processing unit CPU 703, a signal receiver 705, and a user interface (701, 702). Signal receiver 705 may, for example, be a single-carrier or multi-carrier receiver. Signal receiver 705 and the user interface (701, 702) are coupled with the processing unit CPU 703. One or more direct memory access (DMA) channels may exist between multi-carrier signal terminal part 705 and memory 704. The user interface (701, 702) comprises a display and a keyboard to enable a user to use the terminal 7000. In addition, the user interface (701, 702) comprises a microphone and a speaker for receiving and producing audio signals. The user interface (701, 702) may also comprise voice recognition (not shown).

The processing unit CPU 703 comprises a microprocessor (not shown), memory 704 and possibly software. The software can be stored in the memory 704. The microprocessor controls, on the basis of the software, the operation of the terminal 7000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 7, alternatively, middleware or software implementation can be applied. The terminal 7000 can, for instance, be a hand-held device which a user can comfortably carry. The terminal 7000 can, for example, be a cellular mobile phone which comprises the multi-carrier signal terminal part 705 for receiving multicast transmission streams. Therefore, the terminal 7000 may possibly interact with the service providers.

It is noted that, in various embodiments, the wireless node and/or other computer may be implemented as a terminal portion and a receiver portion. The terminal portion might, for example, receive indication of a desired service from its user (e.g., via a GUI and/or other interface provided by the terminal portion), and/or might pass appropriate information to the receiver portion to allow the receiver portion to perform, for instance, various operations for services receipt (e.g., operations including taking in a radio frequency signal and yielding data such as IP packets and/or other packets).

The receiver portion might, for instance, include circuitry for receiving a radio frequency signal and producing a baseband signal, demodulation circuitry, and/or decapsulation circuitry. The receiver portion might, in various embodiments, include a processor (e.g., a microcontroller) and/or memory. The receiver portion might, for instance, pass data (e.g., IP packets and/or other packets) to the terminal portion for further operations (e.g., service presentation to a user). The terminal portion and the receiver portion might, for example, communicate via Universal Serial Bus (USB) or Inter-Integrated Circuit (I2C) bus.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A computer implemented method, comprising:
   determining, at a computer, a characteristic of a currently-received signal to have fallen beneath a threshold;
   creating a candidate signal list, wherein one or more strength sliding averages are calculated with respect to one or more signals corresponding to one or more available radio frequencies, and wherein the candidate signal list includes one or more signals corresponding to highest ones of the sliding averages;
   calculating strength sliding averages for one or more signals of the candidate signal list, wherein dynamic measurement frequencies are employed;
   determining a strongest signal of the signals of the candidate signal list to be stronger than the currently-received signal; and
   employing the strongest signal in place of the currently-received signal.

2. The method of claim 1, further comprising calculating a sliding average difference between strength of the strongest signal and strength of the currently-received signal.

3. The method of claim 1, wherein the characteristic is reception margin.

4. The method of claim 1, further comprising learning of the available radio frequencies by scanning.

5. The method of claim 1, further comprising learning of the available radio frequencies via received information.

6. The method of claim 1, further comprising determining availability of one or more desired services.

7. The method of claim 1, further comprising attempting synchronization lock for signals corresponding to one or more available radio frequencies.

8. The method of claim 1, wherein the candidate signal list lists signals in order of strength.

9. The method of claim 1, further comprising characterizing the strongest signal.

10. The method of claim 1, wherein bit error rate is measured.

11. A computer implemented method, comprising:
calculating, at a computer, a strength sliding average for a first candidate signal of a candidate signal list, wherein the first candidate signal is measured with a first dynamic measurement frequency;
calculating a strength sliding average for a second candidate signal of the candidate signal list, wherein the first candidate signal is stronger than the second candidate signal, and wherein the second candidate signal is measured with a second dynamic measurement frequency; and
evaluating relative strengths of the candidate signals,
wherein the first dynamic measurement frequency is higher than the second dynamic measurement frequency, and
wherein each of the dynamic measurement frequencies is inversely proportional to a reception margin for a currently-received signal.

12. The method of claim 11, further comprising:
calculating a strength sliding average for a third candidate signal of the candidate signal list,
wherein the second candidate signal is stronger than the third candidate signal, wherein the third candidate signal is measured with a third dynamic measurement frequency, and wherein the second dynamic measurement frequency is higher than the third dynamic measurement frequency.

13. The method of claim 11, further comprising determining a candidate signal of the candidate signal list to be stronger than the currently-received signal.

14. The method of claim 11, further comprising determining reception margin for the currently-received signal.

15. The method of claim 11, further comprising creating the candidate signal list.

16. The method of claim 11, further comprising learning of available radio frequencies by scanning.

17. The method of claim 11, further comprising learning of available radio frequencies via received information.

18. The method of claim 11, further comprising determining availability of one or more desired services.

19. The method of claim 11, further comprising employing a candidate signal of the candidate signal list in place of the currently-received signal.

20. The method of claim 11, further comprising attempting synchronization lock for signals corresponding to one or more available radio frequencies.

21. A system, comprising:
a memory having program code stored therein; and
a processor disposed in communication with the memory for carrying out instructions in accordance with the stored program code;
wherein the program code, when executed by the processor, causes the processor to perform:
determining a characteristic of a currently-received signal to have fallen beneath a threshold;
creating a candidate signal list, wherein one or more strength sliding averages are calculated with respect to one or more signals corresponding to one or more available radio frequencies, and wherein the candidate signal list includes one or more signals corresponding to highest ones of the sliding averages;
calculating strength sliding averages for one or more signals of the candidate signal list, wherein dynamic measurement frequencies are employed;
determining a strongest signal of the signals of the candidate signal list to be stronger than the currently-received signal; and
employing the strongest signal in place of the currently-received signal.

22. The system of claim 21, wherein the processor further performs calculating a sliding average difference between strength of the strongest signal and strength of the currently-received signal.

23. The system of claim 21, wherein the characteristic is reception margin.

24. The system of claim 21, wherein the processor further performs learning of the available radio frequencies by scanning.

25. The system of claim 21, wherein the processor further performs learning of the available radio frequencies via received information.

26. The system of claim 21, wherein the processor further performs determining availability of one or more desired services.

27. The system of claim 21, wherein the processor further performs attempting synchronization lock for signals corresponding to one or more available radio frequencies.

28. The system of claim 21, wherein the candidate signal list lists signals in order of strength.

29. The system of claim 21, wherein the processor further performs characterizing the strongest signal.

30. The system of claim 21, wherein bit error rate is measured.

31. A system, comprising:
a memory having program code stored therein; and
a processor disposed in communication with the memory for carrying out instructions in accordance with the stored program code;
wherein the program code, when executed by the processor, causes the processor to perform:
calculating a strength sliding average for a first candidate signal of a candidate signal list, wherein the first candidate signal is measured with a first dynamic measurement frequency;
calculating a strength sliding average for a second candidate signal of the candidate signal list, wherein the first candidate signal is stronger than the second candidate signal, and wherein the second candidate signal is measured with a second dynamic measurement frequency; and
evaluating relative strengths of the candidate signals,
wherein the first dynamic measurement frequency is higher than the second dynamic measurement frequency, and
wherein each of the dynamic measurement frequencies is inversely proportional to a reception margin for a currently-received signal.

32. The system of claim 31, wherein the processor further performs:
calculating a strength sliding average for a third candidate signal of the candidate signal list,
wherein the second candidate signal is stronger than the third candidate signal, wherein the third candidate signal is measured with a third dynamic measurement frequency, and wherein the second dynamic measurement frequency is higher than the third dynamic measurement frequency.

33. The system of claim 31, wherein the processor further performs determining a candidate signal of the candidate signal list to be stronger than the currently-received signal.

34. The system of claim 31, wherein the processor further performs determining reception margin for the currently-received signal.

35. The system of claim 31, wherein the processor further performs creating the candidate signal list.

36. The system of claim 31, wherein the processor further performs learning of available radio frequencies by scanning.

37. The system of claim 31, wherein the processor further performs learning of available radio frequencies via received information.

38. The system of claim 31, wherein the processor further performs determining availability of one or more desired services.

39. The system of claim 31, wherein the processor further performs employing a candidate signal of the candidate signal list in place of the currently-received signal.

40. The system of claim 31, wherein the processor further performs attempting synchronization lock for signals corresponding to one or more available radio frequencies.

41. Integrated circuitry comprising hardware logic programmed to:
   determine a characteristic of a currently-received signal to have fallen beneath a threshold;
   create a candidate signal list, wherein one or more strength sliding averages are calculated with respect to one or more signals corresponding to one or more available radio frequencies, and wherein the candidate signal list includes one or more signals corresponding to highest ones of the sliding averages;
   calculate strength sliding averages for one or more signals of the candidate signal list, wherein dynamic measurement frequencies are employed;
   determine a strongest signal of the signals of the candidate signal list to be stronger than the currently-received signal; and
   employ the strongest signal in place of the currently-received signal.

42. Integrated circuitry comprising hardware logic programmed to:
   calculate a strength sliding average for a first candidate signal of a candidate signal list, wherein the first candidate signal is measured with a first dynamic measurement frequency;
   calculate a strength sliding average for a second candidate signal of the candidate signal list, wherein the first candidate signal is stronger than the second candidate signal, and wherein the second candidate signal is measured with a second dynamic measurement frequency; and
   evaluate relative strengths of the candidate signals,
   wherein the first dynamic measurement frequency is higher than the second dynamic measurement frequency, and
   wherein each of the dynamic measurement frequencies is inversely proportional to a reception margin for a currently-received signal.

43. A computer implemented method, comprising:
   determining, at a computer, lack of synchronization lock;
   attempting synchronization lock with respect to one or more radio frequencies for which information has previously been received;
   calculating a strength sliding average for a first candidate signal of a candidate signal list, wherein the first candidate signal is measured with a first dynamic measurement frequency;
   calculating a strength sliding average for a second candidate signal of the candidate signal list, wherein the first candidate signal is stronger than the second candidate signal, and wherein the second candidate signal is measured with a second dynamic measurement frequency; and
   evaluating relative strengths of the candidate signals,
   wherein the first dynamic measurement frequency is higher than the second dynamic measurement frequency.

44. The method of claim 43, further comprising:
   performing a frequency scan; and
   attempting synchronization lock with respect to one or more radio frequencies discovered via the frequency scan.

* * * * *

UNITED STATES PATENT AND TRADEMARK OFFICE
CERTIFICATE OF CORRECTION

| | | |
|---|---|---|
| PATENT NO. | : 7,821,997 B2 | Page 1 of 1 |
| APPLICATION NO. | : 11/080160 | |
| DATED | : October 26, 2010 | |
| INVENTOR(S) | : Talmola et al. | |

It is certified that error appears in the above-identified patent and that said Letters Patent is hereby corrected as shown below:

On the cover page, item (54), in the title of the patent, please correct "INTERGRATED" to read as --INTEGRATED--.

On the cover page, item (54), in the title of the patent, please correct "BENETH" to read as --BENEATH--.

At column 1, line 2, please correct "INTERGRATED" to read as --INTEGRATED--.

At column 1, line 5, please correct "BENETH" to read as --BENEATH--.

Signed and Sealed this
Twenty-sixth Day of April, 2011

David J. Kappos
*Director of the United States Patent and Trademark Office*